US012671654B1

(12) United States Patent
Delaney et al.

(10) Patent No.: US 12,671,654 B1
(45) Date of Patent: Jun. 30, 2026

(54) ADDRESS ENCODING IN ENCAPSULATED PACKETS

(71) Applicant: Amazon Technologies, Inc., Seattle, WA (US)

(72) Inventors: Matthew Delaney, Portland, OR (US); Jordan Carl Cherry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 582 days.

(21) Appl. No.: 18/067,229

(22) Filed: Dec. 16, 2022

(51) Int. Cl.
H04L 45/74 (2022.01)
H04L 69/22 (2022.01)

(52) U.S. Cl.
CPC .............. H04L 45/74 (2013.01); H04L 69/22 (2013.01); H04L 2212/00 (2013.01)

(58) Field of Classification Search
None
See application file for complete search history.

(56) References Cited

U.S. PATENT DOCUMENTS

| | | | |
|---|---|---|---|
| 7,885,190 B1 * | 2/2011 | Roesch ................. | H04L 67/125 |
| | | | 709/224 |
| 2016/0094444 A1 * | 3/2016 | MeLampy ............ | H04L 67/146 |
| | | | 370/392 |
| 2019/0349303 A1 * | 11/2019 | Previdi ................. | H04L 69/166 |
| 2021/0243107 A1 * | 8/2021 | Retana .................... | H04L 45/04 |
| 2024/0297844 A1 * | 9/2024 | Xie ........................ | H04L 45/741 |

FOREIGN PATENT DOCUMENTS

| | | | | |
|---|---|---|---|---|
| WO | WO-2024192447 A1 * | 9/2024 | ......... | H04L 12/4633 |

* cited by examiner

*Primary Examiner* — Walter J Divito
(74) *Attorney, Agent, or Firm* — Klarquist Sparkman, LLP

(57) ABSTRACT

In a computer networking system, data is transmitted between network devices in packets. The disclosure provides mechanisms for preserving address data in a stateless manner by storing a unique identifier, corresponding to an address of an endpoint targeted by an original source device, in a header field of an encapsulated packet. The unique identifier may be persisted in an encapsulated return packet transmitted back to the original source device and used to recover the address of the endpoint for inclusion in a source header field of the return packet that is transmitted to the original source device.

20 Claims, 10 Drawing Sheets

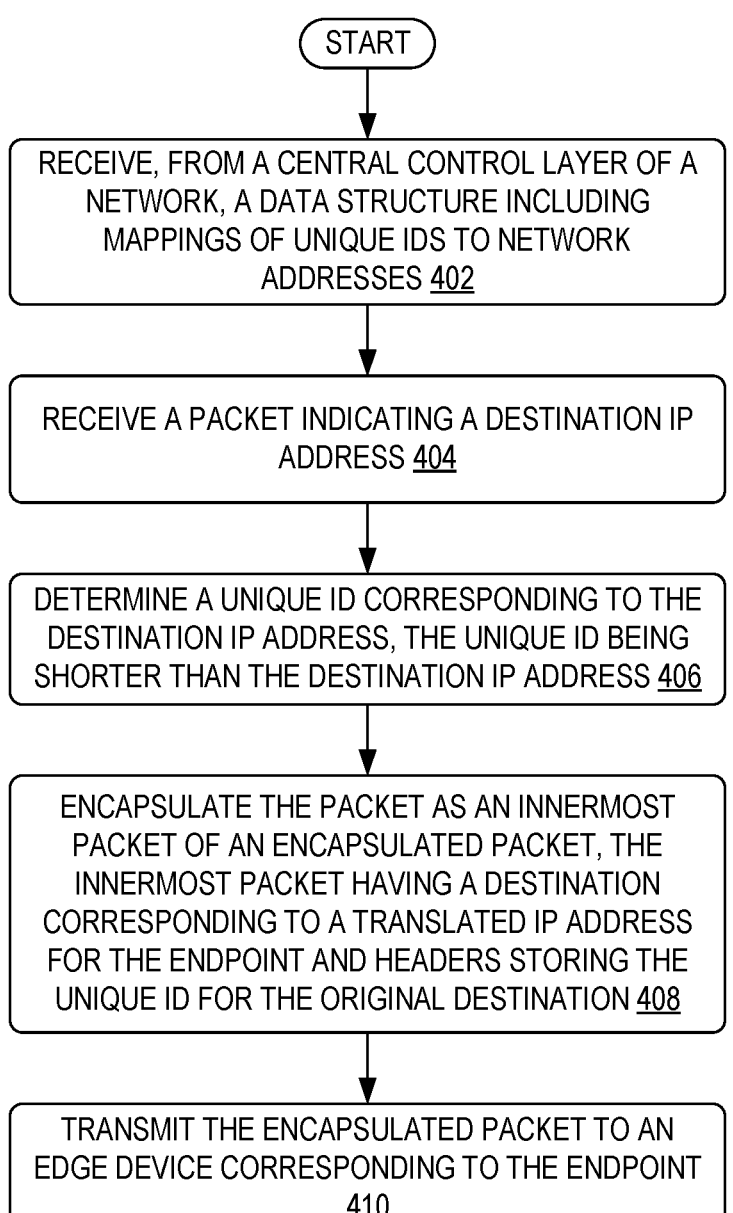

400a

START

RECEIVE, FROM A CENTRAL CONTROL LAYER OF A NETWORK, A DATA STRUCTURE INCLUDING MAPPINGS OF UNIQUE IDS TO NETWORK ADDRESSES 402

RECEIVE A PACKET INDICATING A DESTINATION IP ADDRESS 404

DETERMINE A UNIQUE ID CORRESPONDING TO THE DESTINATION IP ADDRESS, THE UNIQUE ID BEING SHORTER THAN THE DESTINATION IP ADDRESS 406

ENCAPSULATE THE PACKET AS AN INNERMOST PACKET OF AN ENCAPSULATED PACKET, THE INNERMOST PACKET HAVING A DESTINATION CORRESPONDING TO A TRANSLATED IP ADDRESS FOR THE ENDPOINT AND HEADERS STORING THE UNIQUE ID FOR THE ORIGINAL DESTINATION 408

TRANSMIT THE ENCAPSULATED PACKET TO AN EDGE DEVICE CORRESPONDING TO THE ENDPOINT 410

FIG. 4B

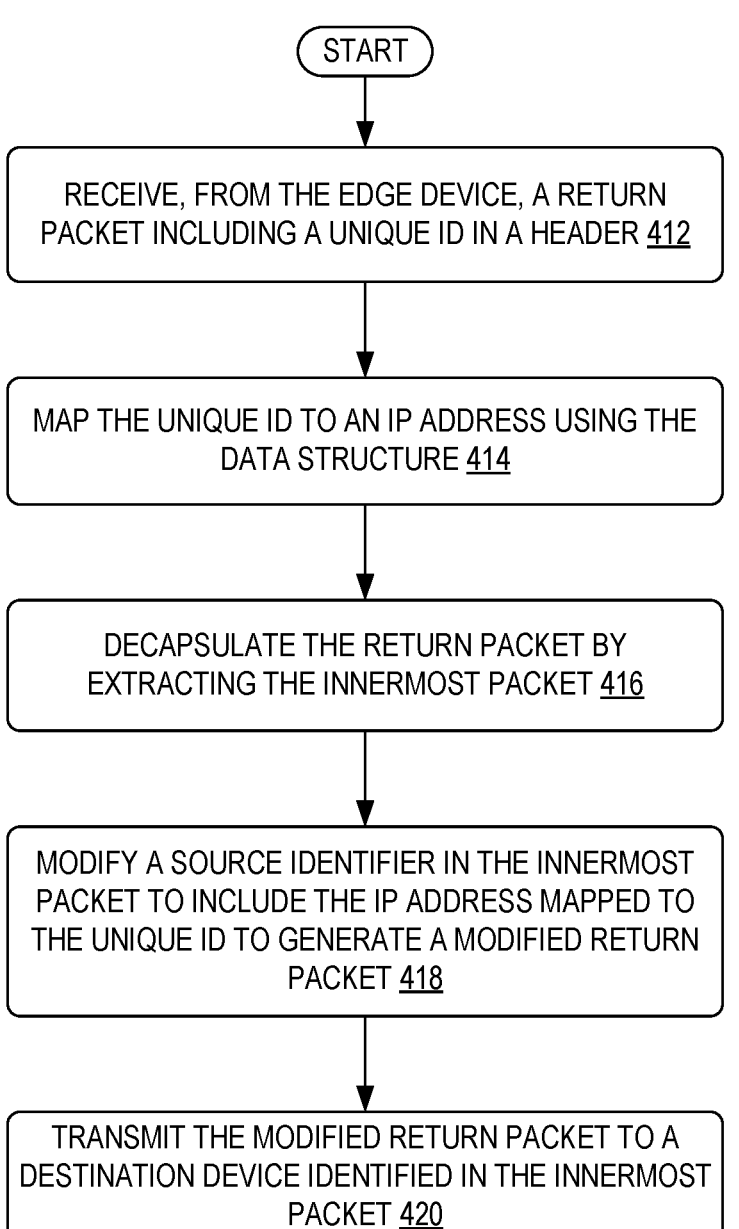

400b

START

RECEIVE, FROM THE EDGE DEVICE, A RETURN PACKET INCLUDING A UNIQUE ID IN A HEADER 412

MAP THE UNIQUE ID TO AN IP ADDRESS USING THE DATA STRUCTURE 414

DECAPSULATE THE RETURN PACKET BY EXTRACTING THE INNERMOST PACKET 416

MODIFY A SOURCE IDENTIFIER IN THE INNERMOST PACKET TO INCLUDE THE IP ADDRESS MAPPED TO THE UNIQUE ID TO GENERATE A MODIFIED RETURN PACKET 418

TRANSMIT THE MODIFIED RETURN PACKET TO A DESTINATION DEVICE IDENTIFIED IN THE INNERMOST PACKET 420

700

START

RECEIVE A PACKET INDICATING A DESTINATION ADDRESS 702

DETERMINE A UNIQUE ID CORRESPONDING TO THE DESTINATION ADDRESS, THE UNIQUE ID BEING SHORTER THAN THE DESTINATION ADDRESS 704

UPDATE AND TRANSMIT THE PACKET THROUGH THE NETWORK, INCLUDING THE UNIQUE ID IN A HEADER FIELD OF THE PACKET 706

FIG. 8

ADDRESS ENCODING IN ENCAPSULATED PACKETS

BACKGROUND

Data may be transmitted throughout a network in the form of a packet. The format and fields of the packet may vary based on network and/or routing protocols. In order to route the packet through the network from a source of the packet to a destination, addresses of network devices that transmit and receive the packet may be included in fields of the packet. The format and content of the packet may change as the packet is routed throughout the network, based on network configurations and policies.

BRIEF DESCRIPTION OF THE DRAWINGS

FIGS. 4A and 4B show flow charts of example methods for encoding address data in encapsulated packets for transmission through a network.

FIG. 8 is an example system diagram showing a plurality of virtual machine instances running in the multi-tenant environment.

DETAILED DESCRIPTION

Figure 1:
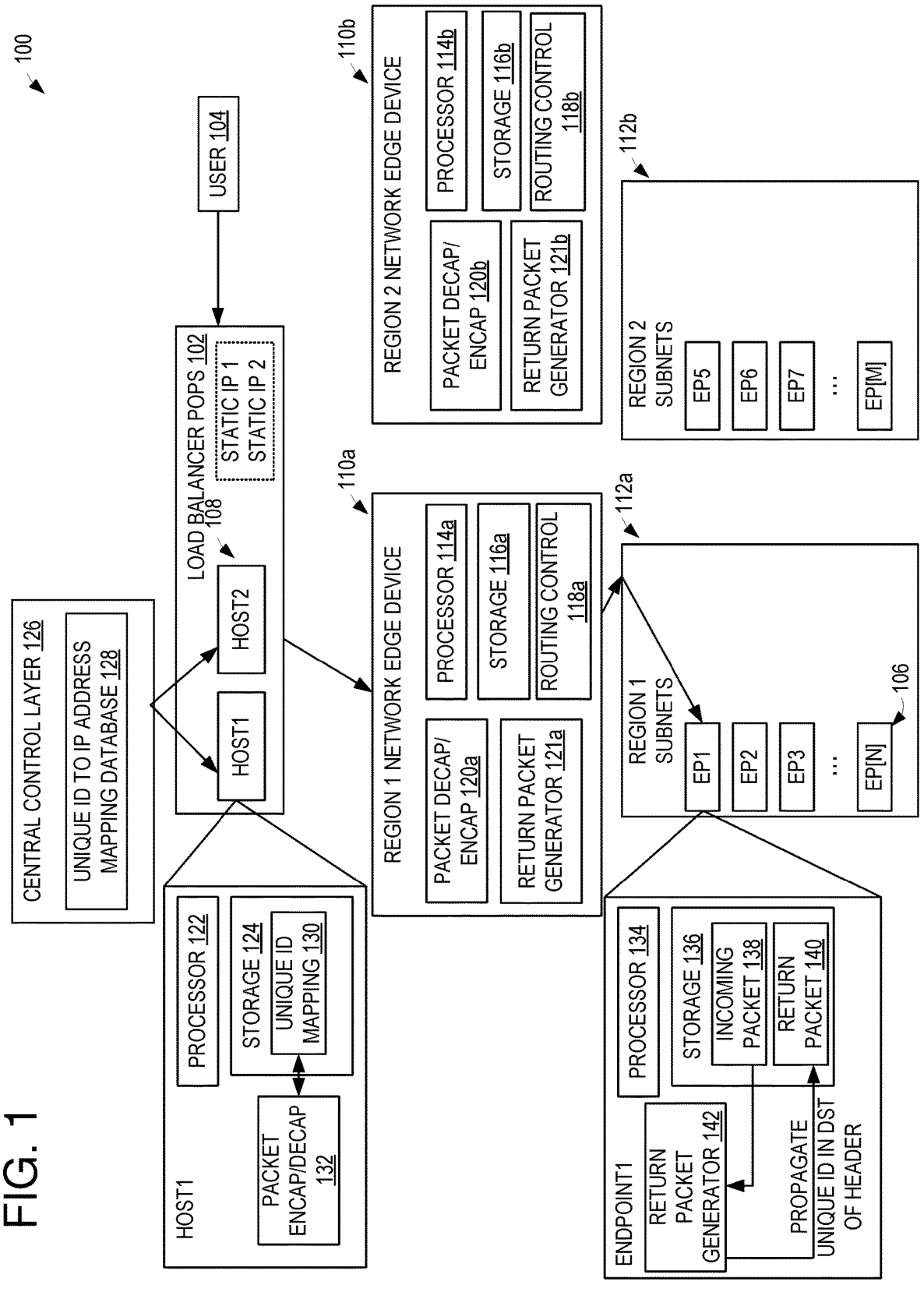
FIG. 1 is an example schematic diagram showing a network routing system configured to encode address data in encapsulated packets.

In networked systems, devices may transmit packetized data from a source to a destination. An originating packet from the source may include a network address, such as an Internet Protocol (IP) address, of itself as well as the destination. However, as the packet is routed through the network, the packet may be modified (e.g., encapsulated, as described in more detail below) to include other addresses, such as the addresses of other devices in the network used to forward and/or route the packet toward the destination. Furthermore, in some systems, network devices may have multiple addresses, such as a private address used within a sub-network, a public address used outside of the sub-network, etc. Accordingly, as the packet is modified during transit through the network, an original destination address may be lost or overwritten to adhere to routing protocols in the network. In this way, any return traffic resulting from an original packet may not be able to be traced as having a source address that matches the destination address of the original packet, unless the original destination address is preserved in some manner.

One approach to maintain the original destination address (e.g., as a source for a return packet) includes storing routing details of packets traversing through the network within network devices. In this approach, the original destination address of an inbound packet can be restored as a source address in an outbound (return) packet when the return packet is received back at a host device that routed the inbound packet. However, this approach utilizes a stateful mechanism that is resource-intensive, using storage space and logging processing power to maintain records of transmission details for each packet routed through the network device. Furthermore, this approach may only function as intended if the return packet is received at a same host device that received the original corresponding inbound packet. If the host device fails before the return packet is transmitted back, the original destination address may not be recovered as the source for the outbound packet, and/or the outbound packet may not be correctly routed back to the original source.

Another approach includes storing the original destination IP address in a header of the packet that is maintained throughout transmission through the network. However, most available header sections of packets, such as a Media Access Control (MAC) address field of an Ethernet header (6 bytes), are too small to store an entire IP address for newer protocols, such as IPv6 (which utilizes addresses that are 16 bytes long).

The disclosure provides storage systems, methods, and related technologies for maintaining address data in encapsulated packets by encoding the address data into a unique identifier (ID) that is stored in a header of the encapsulated packet. In this way, the address data may be reduced in size to allow the data to be retained in available header space of packets. For example, the unique ID may be a value (e.g., a 6 byte value, or a value that is otherwise shorter than a full IP address) uniquely associated with a corresponding global IP address of an endpoint in the network. The unique ID may be stored in a header field of an inner encapsulated packet that is retained through propagation to the endpoint, which further propagates the unique ID in a return packet. The unique ID may then be used to recover the original global IP address for insertion in a source address field of the return packet when routing the return packet to its destination. Additional details of example networking systems are described herein.

FIG. 1 shows an example of a computing network system 100 that utilizes encoded address data in encapsulated packets as described herein. The computing network system 100 includes load balancer points-of-presence (PoPs) 102, which include hosts 108. The hosts 108 may be configured to encapsulate and route packets from users 104 (e.g., received from a larger or external network, such as the Internet) to network devices, such as endpoints 106 in regions 112a and 112b. In some examples, the hosts may access the endpoints via regional subnets, which may be accessed directly or via one or more intermediate devices, such as an edge device(s) for a corresponding region (e.g., edge devices 110a and 110b).

For example, as shown, an incoming (e.g., ingress/inbound) packet from the user 104 may be received by the load balancer PoPs 102 and land on one of the hosts 108. The packet from the user 104 may specify itself as a source of the packet (e.g., in a source header field) and an address as a destination for the packet (e.g., in a destination header field). Generally, the host 108 may be configured to determine a next hop, endpoint, or other network device for communicating the packet based on the address in the destination and/or other information in the packet, and encapsulate the packet in order to prepare the packet for transmission through network devices, such as the edge device 110*a/b* and the network devices of a targeted region (e.g., region 112*a*, which includes endpoints 106). Accordingly, the host 108 may include a processor 122 and storage 124, as well as a packet encapsulation/decapsulation service 132 for perform- ing the above-described processing. In some examples, the packet encapsulation/decapsulation service 132 is config- ured to modify the destination address included in the packet header by translating the destination address in a destination address field of the header to an internally-recognizable/ usable address or to indicate a selected network device for servicing the packet based on the destination address and/or other data in the packet. For example, the user 104 may specify an IP address of the load balancer 102 (e.g., static IP 1 or static IP 2 in some examples) or a public IP address of EP1 as the destination, while the host 108 may determine an edge device to service the packet and/or a private IP address of EP1 that is used by edge device 110*a* and network devices of the region 1 subnet and modify a destination field of the encapsulated packet reflect the determined destination address. However, since the user 104 may not recognize the determined IP address, the disclosed technologies provide mechanisms to store an indicator of the original IP address from the destination field of the packet originating from the user 104 without maintaining stateful connections in the network. For example, when encapsulating the packet, the packet encapsulation/decapsulation service 132 may store an indicator of the original destination address of the packet in a header field of an innermost packet (examples of header fields are described below with respect to FIGS. 5 and 6), which is encapsulated in other packets to assist with routing through the network, as described in more detail below (e.g., with reference to FIG. 3).

In some examples, the original destination address may be stored in a Media Access Control (MAC) address field of a header of the innermost packet (e.g., described in more detail below with respect to FIG. 5). However, as described above, the MAC address field may have a set number of bytes available for use to store the original destination address. In examples where the user 104 specifies an IPv6 address for the destination, or another address that is longer than 6 bytes, the address may not fit in the MAC address space of the header. Accordingly, the disclosed technologies include a mechanism to convert the original destination address to a unique identifier (ID) that is known by the hosts 108 of the network to uniquely correspond to the original destination address. For example, the system 100 also includes a central control layer 126 (e.g., a computing system configured to provide centralized control of unique ID management), which includes a unique ID to IP address mapping database 128 that is configured to manage and distribute a data structure for mapping unique IDs to IP addresses in the network. The database 128 may be config- ured to ensure or guarantee a 1:1 mapping of unique IDs to IP addresses, such that no two IP addresses utilize the same unique ID (e.g., within a given network partition or other network delineation that includes the hosts to which the data structure is propagated for use). In order to fit into relatively small header locations, the unique IDs may be shorter in length (e.g., represented by fewer bytes) than the corre- sponding IP address. In an illustrative example, the unique IDs may be 6 bytes in length and may be determined using a hashing algorithm, a random number generator configured to discard duplications (e.g., to ensure the unique 1:1 map- ping), and/or another mechanism configured to provide the 1:1 mapping described herein. The central control layer 126 may be configured to propagate the data structure to the hosts 108 of the network (e.g., all hosts of the network; although two hosts in the same load balancer PoPs 102 are shown in the illustrated example, it is to be understood that the same unique ID mapping from central control layer 126 may also be provided to hosts in other load balancer PoPs in the network), and to ensure that any updates to the data structure (e.g., additions or deletions of unique ID mappings to IP addresses, such as when network devices or public destination addresses are added to or removed from the network) are propagated to the hosts (e.g., responsive to changes in the network to remove/add network devices and/or network addresses, such as public domain addresses). Accordingly, the data structure may be stored as unique ID mapping 130 in the hosts 108.

The packet encapsulation/decapsulation service 132 may be configured to access the unique ID mapping 130 to determine a unique ID associated with the original destina- tion address specified by the user 104 and store the unique ID in the MAC address field (or another header field) of the innermost packet. The unique ID mapping 130 may include any suitable data structure usable by the host 108 to deter- mine the unique ID corresponding to a given IP address (or other address data). For example, the unique ID mapping 130 may be a lookup table, a list, a hashing algorithm, a distributed hash table, and/or any other schema usable to perform the described mapping. The host may then send the encapsulated packet to a network edge device (e.g., edge device 110*a*, based on a location of the endpoint EP1 that determined as the destination).

The network edge devices 110*a/b* may include associated processors 114*a/b*, storage devices 116*a/b*, routing control 118*a/b*, packet decapsulation/encapsulation services 120*a/b*, and return packet generators 121*a/b*, respectively. For example, network edge device 110*a* may utilize routing control 118*a* to analyze the headers of the encapsulated packet received from host 108 to determine a next hop (e.g., in subnet of region 1 112*a*) to send the packet. The packet decapsulation/encapsulation service 120*a* may be config- ured to strip the outermost packet and transmit the packet to the corresponding region for routing the packet to the destination specified by the destination address in the inner- most packet.

The return packet generator 121*a* may be configured to generate a return packet to be transmitted back to the user 104 corresponding to the packet received from user 104. For example, the incoming packet from the user 104 may designate that return data is requested, or the network edge device 110*a* may otherwise be configured to automatically send a return packet with response data and/or a confirma- tion of receipt of the incoming packet. The return packet generator 121*a* is configured to generate an encapsulated return packet that maintains storage of the unique ID in the return packet, for example, in a MAC address header field of an innermost packet of the return packet (e.g., in a source MAC address header field). In this way, when the return packet is received by a host of the load balancer PoPs 102, the host may recover the original destination IP address and store it as a source address in a modified return packet to be delivered to the user 104. As described above, the use of the unique ID enables any host to recover the original destina- tion IP address in a return packet, even if the host did not handle the associated incoming packet that triggered the transmission of the return packet. For example, the return packet may be directed to a static IP address of the load balancer PoPs 102, and be directed to a host of the PoPs 102 that is best available to service the return packet regardless of whether the host serviced the corresponding incoming packet. This advantage of the disclosed technologies is described in more detail below in the further illustrated examples. As another advantage, the selection of the MAC address header field for storing the unique ID leverages the consideration that most edge devices and endpoints are already configured to and automatically support the action of preserving the MAC addresses in return packets, so the unique ID may be propagated in return packets without further modification of the devices generating the return packets.

As described above, the network edge device 110a may be configured to propagate the packet received from user 104 (e.g., via a host 108) to an endpoint in a region of the network. The regions 112a/b may include respective subnets, which may be separated by a translation layer in some examples. The packet may thus be transmitted through the region 1 subnets for receipt at endpoint EP1, which is specified as the destination of the innermost packet (e.g., as designated by the host or network edge device that processed the incoming packet from the user 104). In some examples, the endpoints 106 may include components similar to the network edge device, such as a processor 134, and storage 136 (e.g., storing incoming packets 138 and generated outgoing/return packets 140), and a return packet generator 142. In some examples, the endpoints may be configured to automatically send a return packet with response data and/or a confirmation of receipt of the incoming packet from the user 104, in a manner similar to that described above with respect to the return packet generator 121a. In this way, either or both of the edge device and the endpoint may be configured to send a return packet that preserves the unique ID in a header field, as described herein. Thus, the return packet generator 142 may configured to operate as described above with respect to return packet generator 121a of the network edge device 110a. For example, the return packet generator of the endpoint may generate an encapsulated return packet that maintains storage of the unique ID in the return packet, for example, in a MAC address header field of an innermost packet of the return packet, which is processed by one of the hosts 108 (e.g., after transmitting the return packet back toward the user 104) to recover the original destination address specified by the user 104 as described above with respect to the example in which the return packet is generated in the network edge device 110a.

Figure 2:
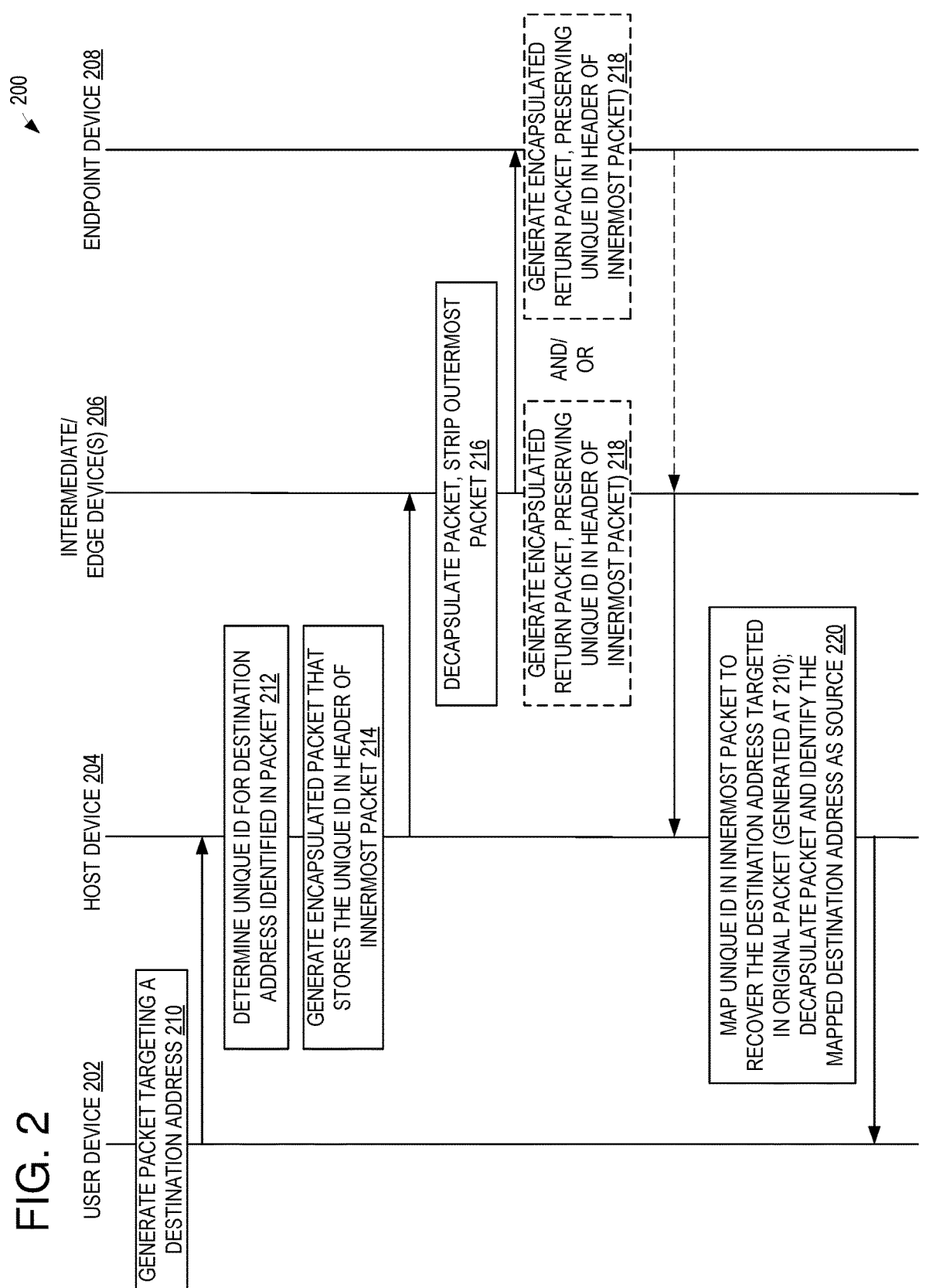
FIG. 2 is an example communication diagram showing exemplary operations and transmissions between network devices to encode address data in encapsulated packets.

FIG. 2 is a communication diagram 200 showing example operations and corresponding transmissions between network devices. In the example of FIG. 2, a user device 202 sends data to an endpoint device 208 via a host device 204 and one or more intermediate and/or edge device(s) 206. For example, the host device 204 may correspond to one of the hosts 108 of FIG. 1, the intermediate/edge device(s) 206 may correspond to edge device 110a or edge device 110b of FIG. 1, and the endpoint may correspond to one of the endpoints 106 of FIG. 1. It is to be understood that the communication diagram 200 provides a simplified, exemplary network setup, and additional or alternative network devices may be involved in the communication of packets as described below. For example, one or more additional network devices may be present between the intermediate/ edge device(s) 206 and the endpoint device 208 without departing from the scope of the disclosure. As another example, the host device may communicate directly with the endpoint 208, in which case, the operations shown as being performed by the intermediate/edge device(s) 206 may be omitted or performed by the endpoint 208. For simplicity, the description below is generally directed to an example in which the intermediate/edge device(s) 206 includes a single edge device. In examples where the intermediate/edge device(s) 206 includes more than one network device, it is to be understood that the disclosed operations performed by the intermediate/edge device(s) 206 may be performed by one, some, or all of the intermediate/edge device(s) to process incoming packets, propagate packets to the endpoint 208, and/or generate return packets.

At 210, the user device generates a packet targeting a destination address, such as an IP address for a load balancer associated with host device 204, which may be configured to direct the packet to a corresponding endpoint (e.g., endpoint 208) based on information in the packet and/or configuration rules/settings. For example, the packet generated at 210 may include (e.g., in an associated header field), an IP source address for the user device 202 and an IP destination address for a load balancer PoP that includes the host device 204. The generated packet may be sent out directly to the host device 204 and/or may arrive at the host device 204 from the Internet. After receiving the original packet from the user device 202, the host device 204 may, in some examples, recognize/determine that the original packet specifies an IPv6 or other long (e.g., longer than a threshold length/larger than a threshold size, such as 6 bytes) address for the destination address. At 212, the host device 204 determines a unique ID corresponding to the destination IP address specified in the original packet (e.g., responsive to the determination that the destination IP address is longer than the threshold in examples—9—here the above-described determination of destination IP address length is made). For example, the host device 204 may utilize a data structure (e.g., the unique ID mapping data structure 130 of FIG. 1) to map the IP address from the destination header field of the original packet to a corresponding unique ID. At 214, the host device 204 generates an encapsulated packet that stores the unique ID in a header of the innermost packet. In order to properly transmit the packet through the network to the endpoint device 208, the host device may also modify the destination address of the innermost packet to reflect an internal address (e.g., an internal IP address) of the endpoint device and/or an edge device to route the packet to the endpoint device. Accordingly, the storage of the unique ID in the header of the innermost packet preserves the original IP address of the destination. Additional examples of the encapsulated packet are described in more detail below with respect to FIG. 3.

The host device 204 may then transmit the encapsulated packet to the edge device 206. At 216, the edge device 206 decapsulates the packet, stripping the outermost packet, and forwards the decapsulated packet to the endpoint device 208. In some examples, the edge device 206 may be configured to transmit a return packet to the original source of the received packet (e.g., the user device 202), for example, in order to confirm receipt of the packet or provide responsive data based on the payload of the packet (e.g., if the original packet requests return data from the endpoint device). In additional or alternative examples, the endpoint device 208 may be configured to send such a return packet. Accordingly, at 218, the edge device 206 and/or the endpoint device 208 generates an encapsulated return packet, preserving the unique ID in a header of the innermost packet. In examples where the endpoint device 208 generates the return packet, since the return packet will still traverse the edge device 206 before being routed to a host device to be returned to the user device, the endpoint device may utilize its internal address in the source address field of the innermost packet of the return packet, however the unique ID stored in the headers of the innermost packet may preserve the original destination address of the packet generated at 210. Likewise, in examples where the edge device 206 generates the return packet, the edge device may utilize its address in the source address field of the innermost packet of the return packet, while the unique ID may be stored in headers of the innermost packet to preserve the original destination address of the packet generated at 210.

In some examples in which the endpoint device generates the return packet, after receiving the encapsulated return packet form the endpoint device 208, the edge device 206 may replace or modify the outmost packet by identifying a next hop for the packet based on load balancing and/or routing rules and inserting the next hop as the destination in the outermost packet of the return packet. However, the edge device 206 may maintain the storage of the unique ID in the header of the innermost packet of the return packet.

The modified return packet may be received by the host device 204, which may recognize the inclusion of the unique ID in the header field of the innermost packet, triggering the host device 204 to further modify the return packet. At 220, the host device 204 maps the unique ID in the innermost packet of the return packet to a corresponding IP address (e.g., the IP address specified as the destination of the original packet generated at 210) and identify that mapped IP address as the source of the innermost packet (e.g., updating the source IP address for the innermost packet to reflect the mapped IP address). The updated packet may then be transmitted to the user device 202 as a return packet.

Figure 3:
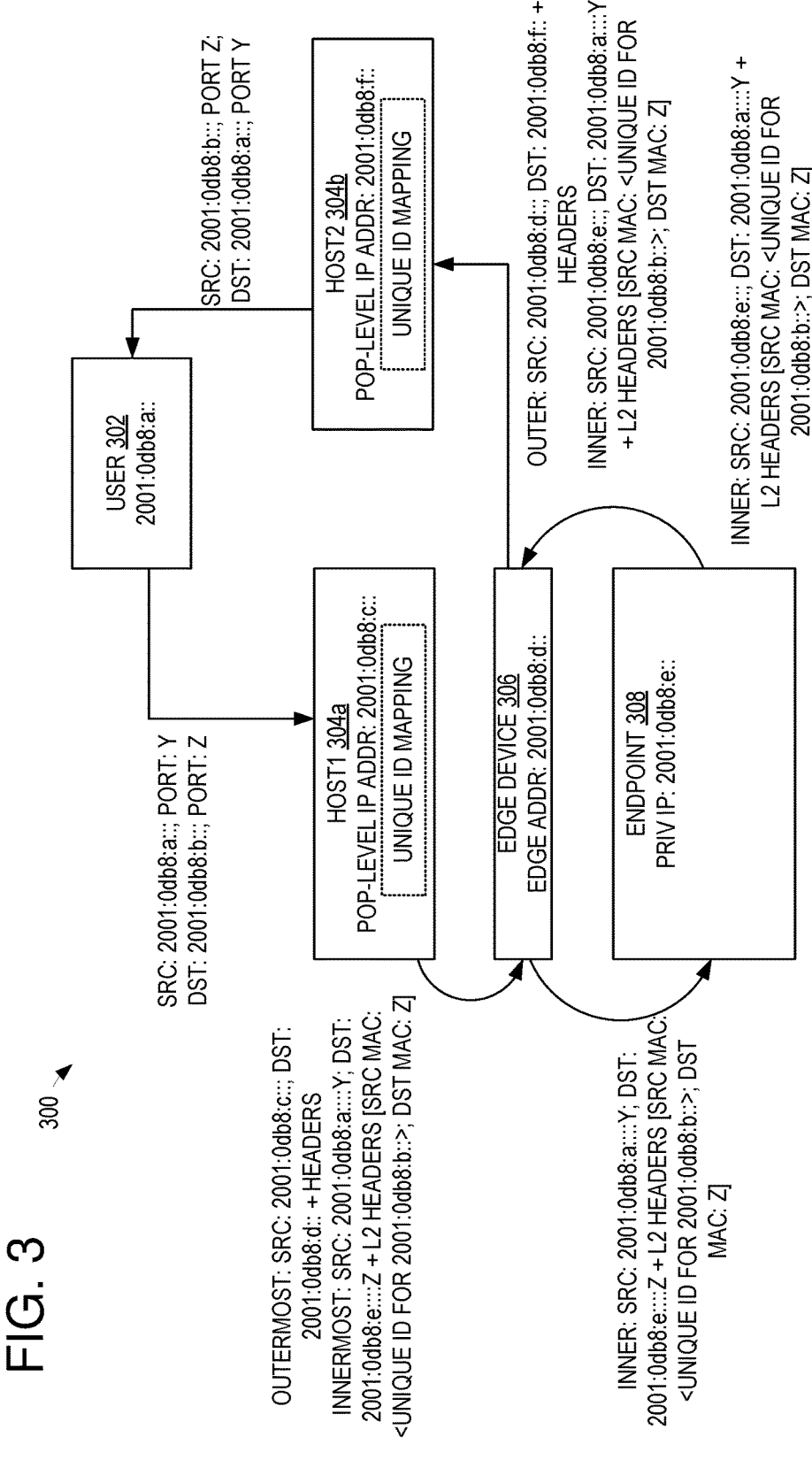
FIG. 3 is an example schematic diagram showing example encapsulated packets including encoded address data.

FIG. 3 is another schematic diagram of a computing network system 300, showing example address fields of encapsulated packets at different stages of routing packets through a network. The network in system 300 includes a user 302 (e.g., a user device), a first host 304a, a second host 304b, an edge device 306, and an endpoint 308. The first and second hosts 304a/b may correspond to the hosts 108 of FIG. 1 and/or the host device 204 of FIG. 2, the edge device 306 may correspond to the edge devices 110a and/or 110b of FIG. 1 and/or edge device 206 of FIG. 2, and the endpoint 308 may correspond to the endpoints 106 of FIG. 1 and/or the endpoint device 208 of FIG. 2. As shown in FIG. 3, each device has one or more representative addresses associated thereto; for example, user 302 has an address of 2001:0Odb8:a::, host1 304a has a point-of-presence (PoP)-level address (e.g., a host address) 2001:0db8:c::, host2 304b has a PoP-level address 2001:0db8:f::, edge device 306 has an edge address of 2001:0db8:d::, and endpoint 308 has a private IP address of 2001:0db8:e::.

In the example of FIG. 3, user 302 sends a packet specifying itself as a source (e.g., with a source address of 2001:0db8:a::and a port of Y) and a destination address (e.g., 2001:0db8:b::, which may correspond to a load balancer associated with hosts 304a and 304b or another public-facing IP address) as a destination. This packet is received by the host1 304a, which includes a unique ID mapping component to map the global IP address of the destination to a corresponding unique ID, as described in more detail above with respect to FIGS. 1 and 2. The host1 304a also encapsulates the packet in other packets in order to traverse the remaining network devices between the host and the endpoint to which the packet will be sent in accordance with the destination address and/or other data in the packet. An example of addresses included in the encapsulated packet are shown beside the arrow representing the transmission of an encapsulated packet from the host1 304a to the edge device 306. In the illustrated example, the outermost packet includes a source address of the host1 304a (e.g., 2001:

0db8:c::) and a destination address of the edge device 306 (e.g., 2001:0db8:d::), as well as headers corresponding to an encapsulation protocol used to encapsulate the packet (e.g., Generic Network Virtualization Encapsulation [Geneve] headers, or other types of headers). The destination address may be selected based on routing protocols and/or rules, such as a determination that the edge device 306 corresponds to a region that includes an endpoint for receiving the packet from the user 302. The outer packet may be used to target and traverse a desired edge device.

An innermost packet may be used to represent the original packet provided by the user 302. For example, the innermost packet of FIG. 3 includes a source address of the user 302 (e.g., 2001:0db8:a::, and a port of Y) and a destination address corresponding to the private IP address of the endpoint (e.g., 2001:0db8:e::, and a port of Z), as well as L2 headers (e.g., Ethernet packet headers). The L2 headers may include a source MAC address and a destination MAC address. In order to preserve the original IP address of the destination identified in the encapsulated packet, the host1 304a may use the unique ID mapping data structure to determine a unique ID corresponding to the destination IP address 2001:0db8:b:: (e.g., the original destination address specified by the user 302) and store that unique ID in the source MAC address (e.g., storing the originally-specified destination port, Z in the illustrated example, in the destination MAC address). It is to be understood that in alternate examples, the unique ID and port may be stored in opposing MAC address fields (e.g., the unique ID may be stored in the destination MAC address field and the port may be stored in the source MAC address field).

After receiving the encapsulated packet from the host1 304a, the edge device 306 may decapsulate the packet by removing the outermost packet and associated headers, to form a decapsulated packet including an inner packet (e.g., corresponding to the innermost packet generated by the host1 304a). As shown in FIG. 3, the inner packet from the edge device 306 maintains the unique ID in the L2 headers. The decapsulated packet from edge device 306 is transmitted to the endpoint (e.g., via one or more intervening devices of one or more subnets in some examples).

As described above, the endpoint 308 may be configured to generate a return packet to send back to the user 302. In order to preserve the original destination address specified by the user 302, the return packet generated by the endpoint 308 retains the unique ID in L2 headers of an inner packet, as shown in FIG. 3. An inner packet of the return packet specifies the private IP address of the endpoint as a source and the address of the user 302 as the destination. In this way, the encapsulated return packet is formed by effectively swapping the source and destination fields of the original inner packet received from the edge device.

As described above, one of the advantages of the disclosed approach of encoding address data in headers of a packet in a stateless manner is that the return packet may be serviced by one or more different network devices than the original incoming packet (e.g., the original packet may traverse a first route through the network from the user to the endpoint and the corresponding return packet may traverse a second, different route through the network from the endpoint to the user). An example of this is shown in FIG. 3, where the return packet is routed from the edge device 306 to host2 304b, which is different from the host (host1 304a) that serviced the original incoming packet from user 302. As shown, the edge device encapsulates the inner packet with an outer packet that specifies itself (the edge device 306) as a source and host2 304b as the destination.

Upon receiving the return packet, the host2 304*b* may recognize that the return packet includes a unique ID stored in the inner packet, and may utilize a unique ID mapping data structure (e.g., the same as the data structure stored in host1 304*a*, in that both hosts received the same data structure from a central source, as described in more detail above with respect to FIG. 1) to map the unique ID to a corresponding IP address. The host2 304*b* may strip the outer packet and modify the inner packet to replace the source with the IP address mapped to the unique ID stored in the headers of the inner packet, and transmit this modi-fied/decapsulated packet to the user 302. The modified/decapsulated packet may also include a port of the source, retrieved from the headers of the inner packet as shown in FIG. 3.

FIGS. 4A and 4B are flow charts of example methods 400*a* and 400*b* for using a unique ID encoding an original destination address to preserve the address in a stateless manner. For example, methods 400*a* and 400*b* may be performed using one or more components of the system 100 of FIG. 1, system in communication diagram 200 of FIG. 2, and/or system 300 of FIG. 3, such as one or more of the host devices 108 of FIG. 1, the host device 204 of FIG. 2, and/or the host devices 304*a/b* of FIG. 3. Starting with method 400*a*, at 402, the method includes receiving, from a central control layer of a network, a data structure including map-pings of unique IDs to network addresses, such as global IP addresses (e.g., IPv6 addresses, and/or other addresses that are larger than 6 bytes).

At 404, the method includes receiving a packet indicating a destination IP address. As described above, the destination IP address may be a global IP address, such as a public IP address, of a load balancer or other network device, which may be configured to propagate the packet to an endpoint on the network In order to preserve this IP address even if it is overwritten by network devices or otherwise lost during encapsulation/decapsulation of the packet, the host device may store a representation of the IP address in a header of the packet. In order to reduce the number of bytes used to represent the IP address, the IP address may be mapped to a unique ID, which has fewer bytes than the IP address. For example, at 406, the method includes determining a unique ID corresponding to the destination IP address, the unique ID being shorter than the destination IP address.

At 408, the method includes encapsulating the packet as an innermost packet of an encapsulated packet, the inner-most packet having a destination corresponding to an IP address for a next hop for the packet, such as a translated IP address for the endpoint (e.g., a private IP address used by a subnet including the endpoint) and/or an IP address for an edge device, and headers storing the unique ID for the original destination address specified in the packet received at 404. For example, as described above, a MAC address header (e.g., a destination MAC address header) may store the unique ID.

At 410, the method includes transmitting the encapsulated packet to an edge device corresponding to the endpoint. As shown and described in more detail above (e.g., with respect to FIG. 3), the edge device may further decapsulate/modify the packet and transmit it to the endpoint in examples where the endpoint is downstream of the edge device. Furthermore, the endpoint and/or the edge device may generate a return packet, which is returned to the source of the packet received at 404 via the host device.

As further described above with respect to FIG. 3, the disclosed technology allows different host devices to service return packets (e.g., different from the host devices that serviced the original, incoming packet corresponding to the return, outgoing/outbound packet). Accordingly, FIG. 4B shows another method 400*b*, which relates to operations of a host device that receives an outgoing packet, from an endpoint (e.g., via an edge device of the network) or directly from an edge device, that includes a unique ID. It is to be understood that method 400*b* may thus be a follow-on corresponding to receipt of a return packet resulting from the operations of method 400*a*, or a separate method corre-sponding to receipt of a wholly different return packet (e.g., for a different user device, or for a different original/incoming packet than the one received at 404 of FIG. 4A). At 412, the method includes receiving from the edge device (or from another edge device), a return packet including a unique ID in a header field. At 414, the method includes mapping the unique ID to an IP address using the data structure (e.g., the data structure described above at 402/406).

At 416, the method includes, in some examples, decap-sulating the return packet by extracting the innermost packet. For example, an outer packet of the return packet may be present to route the packet to the host device, and may be discarded upon receipt by the host device. At 418, the method includes modifying a source address identifier in the innermost packet to include the IP address mapped to the unique ID (e.g., the IP address that was originally included in a destination field of an incoming packet corresponding to the outgoing return packet) to generate a modified return packet. For example, the innermost packet may originally include in a source address field a private IP address of the endpoint, and may be replaced with the mapped IP address (e.g., a public IP address). At 420, the method includes transmitting the modified return packet to a destination device identified in the innermost packet. For example, the destination device may be a source of the packet that triggered the sending of the return packet (e.g., an original incoming/inbound packet).

Figure 5:
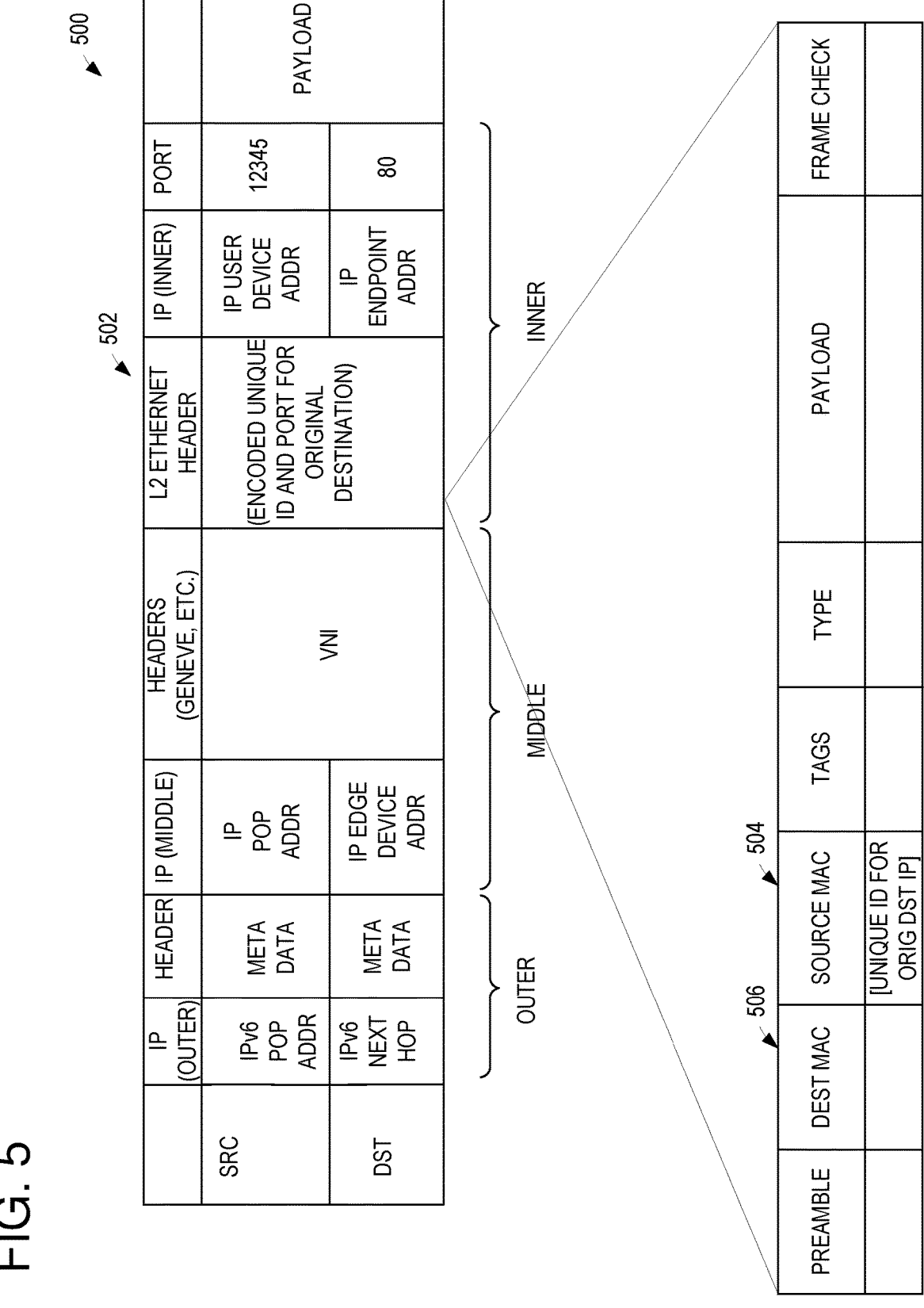
FIG. 5 shows an example format of a packet including encoded address data in a header.
Figure 6:
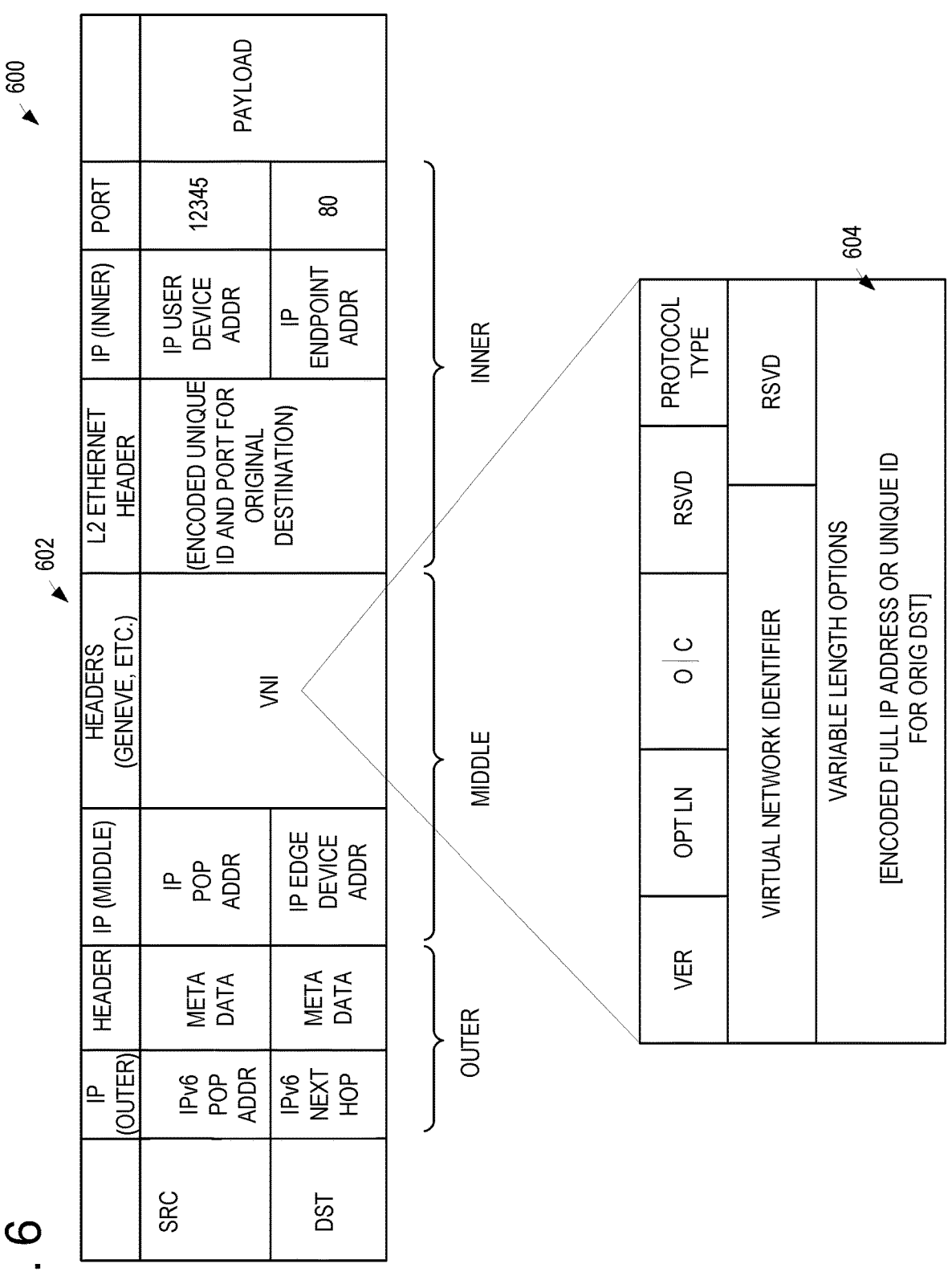
FIG. 6 shows another example format of a packet including encoded address data in a header.

FIGS. 5 and 6 show example structures and/or formats of encapsulated packets that may store a unique ID encoding an IP address, and that may be transmitted through a network as described above with respect to FIGS. 1-4B. FIG. 5 shows a first example packet 500, which includes source and destination information in outer (e.g., outermost), middle, and inner (e.g., innermost) packets. As shown, the unique ID described herein may be stored in a source MAC address field 504 of an L2 ethernet header 502 of an innermost packet. As further described above, in alternate examples, the unique ID may be stored in a destination MAC address field 506. In some examples, the unique ID may be stored in a destination MAC address field when inbound (e.g., tra-versing the network toward the endpoint, in the above-described examples of FIGS. 1-4B), and swapped to be stored in the source MAC address field when outbound (e.g., traversing the network toward the originating user device, in the above-described examples of FIGS. 1-4B), or vice versa.

FIG. 6 shows an alternative example packet 600, in which the unique ID may be stored in a variable length options field 604 of a Geneve header 602. As the variable length options field 604 is larger than the MAC address field 504 of FIG. 5, this header may alternatively be used to encode the full global IP address of the endpoint in some examples.

Figure 7:
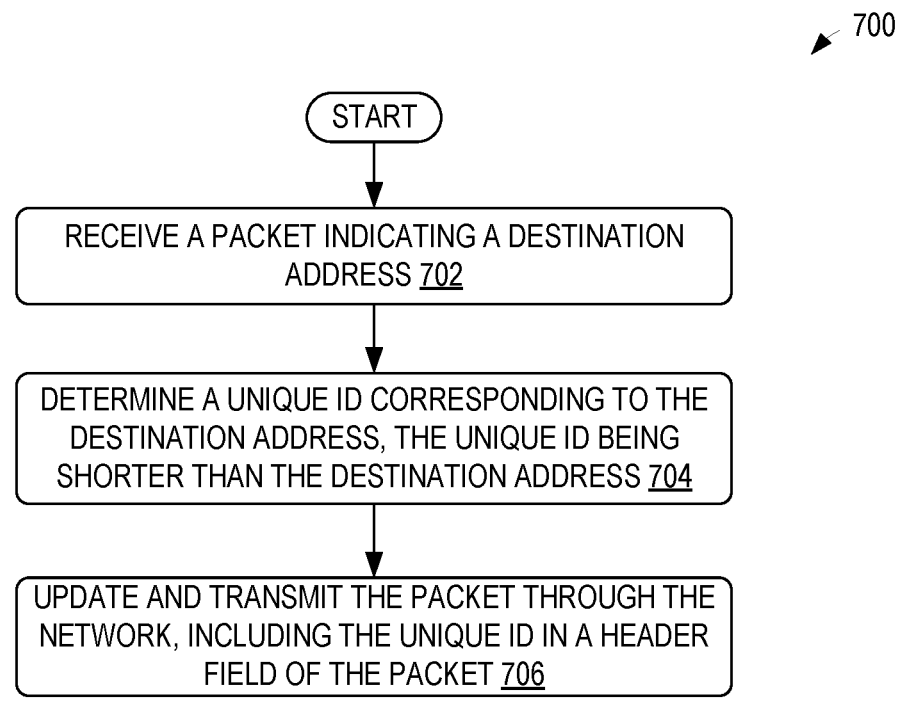
FIG. 7 shows a flow chart of an example method for encoding address data in encapsulated packets for transmission through a network.

FIG. 7 is a flow chart of an example method 700 for using a unique ID encoding an original destination address to preserve the address in a stateless manner. For example, method 700 may be performed using one or more compo-nents of the system 100 of FIG. 1, system in communication diagram 200 of FIG. 2, and/or system 300 of FIG. 3, such as one or more of the host devices 108 of FIG. 1, the host device 204 of FIG. 2, and/or the host devices 304*a/b* of FIG. 3. At 702, the method includes receiving a packet indicating a destination address. For example, the packet may be received at a host device of a network, and may indicate a destination address corresponding to an endpoint in the network and/or corresponding to another network device in the network (e.g., a load balancer associated with the host device).

At 704, the method includes determining a unique ID corresponding to the destination address, the unique ID being shorter than the destination address. For example, as described above, determining the unique ID may include mapping the destination address to the unique ID using a pre-configured data structure, algorithm, and/or other mechanism provided by a central control plane that manages 1:1 associations between unique IDs and IP addresses in the network).

At 706, the method includes updating and transmitting the packet through the network (e.g., toward an endpoint, which may correspond to the destination address, or to a next hop determined by a network device corresponding to the destination address), including the unique ID in a header field of the packet.

Figure 8:
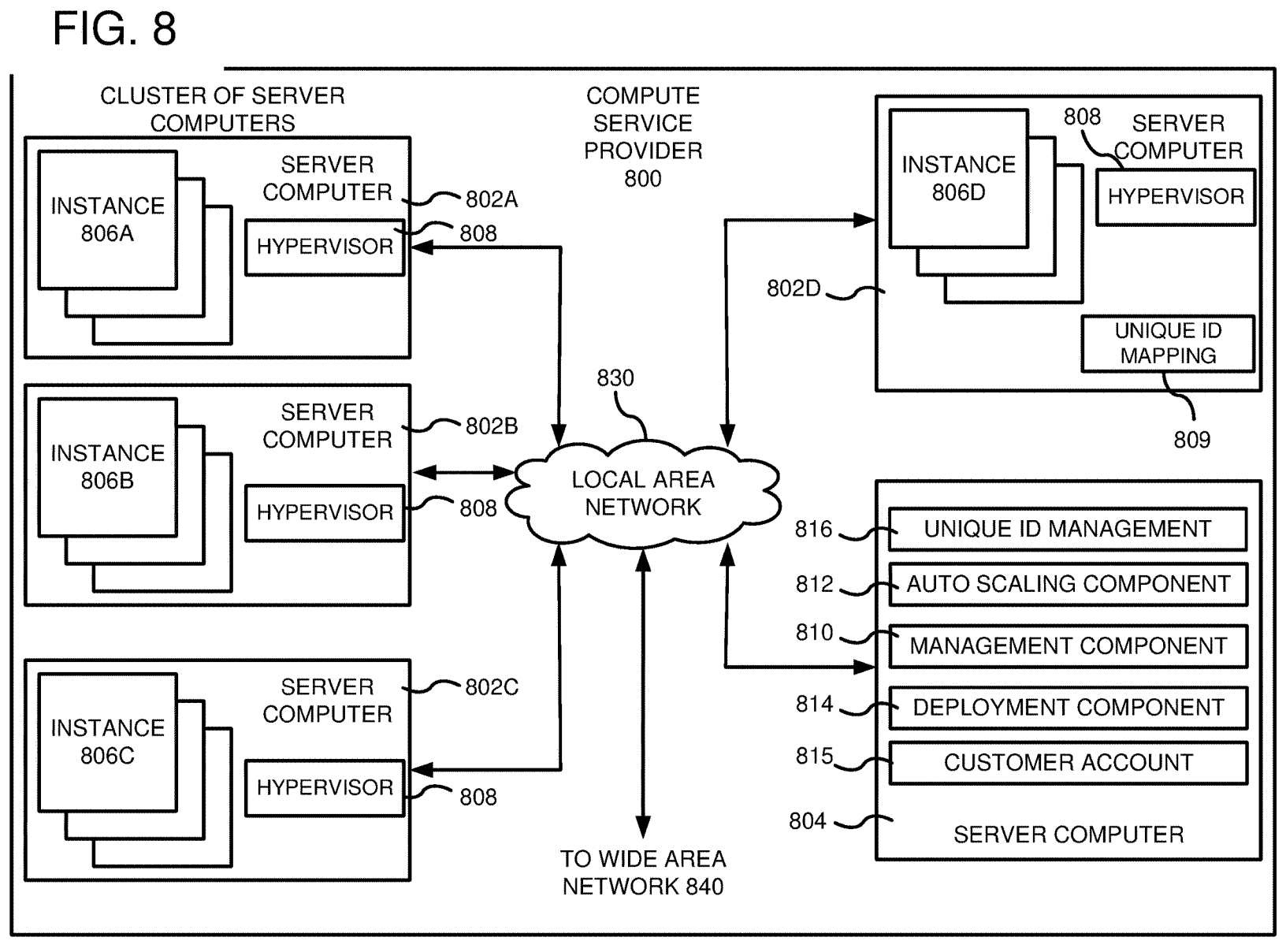

FIG. 8 is a computing system diagram of a network-based compute service provider 800 that illustrates one environment in which embodiments described herein can be used. By way of background, the compute service provider 800 (i.e., the cloud provider) is capable of delivery of computing and storage capacity as a service to a community of end recipients. In an example embodiment, the compute service provider can be established for an organization by or on behalf of the organization. That is, the compute service provider 800 may offer a "private cloud environment." In another embodiment, the compute service provider 800 supports a multi-tenant environment, wherein a plurality of customers operate independently (i.e., a public cloud environment). Generally speaking, the compute service provider 800 can provide the following models: Infrastructure as a Service ("IaaS"), Platform as a Service ("PaaS"), and/or Software as a Service ("SaaS"). Other models can be provided. For the IaaS model, the compute service provider 800 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 800 using networked client devices, such as desktop computers, laptops, tablets, smartphones, etc. running web browsers or other lightweight client applications. Those skilled in the art will recognize that the compute service provider 800 can be described as a "cloud" environment.

In some implementations of the disclosed technology, the computer service provider 800 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 800 includes a plurality of server computers 802A-802D. While only four server computers are shown, any number can be used, and large centers can include thousands of server computers. The server computers 802A-802D can provide computing resources for executing software instances 806A-806D. For example, the server computers 802A-802D may include storage devices configured to store data (e.g., including instructions for executing software instances 806A-806D and/or data usable by instances 806A-806D in some examples). In one embodiment, the instances 806A-806D are virtual machines. As known in the art, a virtual machine is an instance of a software implementation of a machine (i.e., a computer) that executes applications like a physical machine. In the example of virtual machine, each of the servers 802A-802D can be configured to execute a hypervisor 808 or another type of program configured to enable the execution of multiple instances 806 on a single server. Additionally, each of the instances 806 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more of the server computers in the compute service provider may include at least some of the components of the systems illustrated at 100, 200, and 300 of FIGS. 1, 2, and 3, respectively. For example, one or more of the servers may include a host, edge device, or other network device, such as those described in FIGS. 1-4B above, and/or one or more of the servers may include an endpoint and/or execute an instance corresponding to an endpoint such as those described in FIGS. 1-4B above. As shown in server computer 802D for illustrative purposes (and understood to be optionally present in any of the servers/server computers of FIG. 8), the server computer(s) may include a unique ID management service 816 and/or a unique ID mapping data structure 811 (which may be a copy of a data structure managed by management service 816), used to encode address data in encapsulated packets as described above. The unique ID mapping data structure 811 may be an example of unique ID mapping 130 of FIG. 1 (and related mappings described above in the remaining figures), and unique ID management service 816 may be an example of database 128 as managed by central control layer 126 in FIG. 1 (and related operations described above).

One or more server computers 804 can be reserved for executing software components for managing the operation of the server computers 802 and the instances 806. For example, the server computer 804 can execute a management component 810. A customer can access the management component 810 to configure various aspects of the operation of the instances 806 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 812 can scale the instances 806 based upon rules defined by the customer. In one embodiment, the auto scaling component 812 allows a customer to specify scale-up rules for use in determining when new instances should be instantiated and scale-down rules for use in determining when existing instances should be terminated. The auto scaling component 812 can consist of a number of subcomponents executing on different server computers 802 or other computing devices. The auto scaling component 812 can monitor available computing resources over an internal management network and modify resources available based on need.

A deployment component 814 can be used to assist customers in the deployment of new instances 806 of computing resources. The deployment component can have access to account information associated with the instances, such as who is the owner of the account, credit card information, country of the owner, etc. The deployment component 814 can receive a configuration from a customer that includes data describing how new instances 806 should be configured. For example, the configuration can specify one or more applications to be installed in new instances 806, provide scripts and/or other types of code to be executed for configuring new instances 806, provide cache logic specifying how an application cache should be prepared, and other types of information. The deployment component 814 can utilize the customer-provided configuration and cache logic to configure, prime, and launch new instances 806. The configuration, cache logic, and other information may be specified by a customer using the management component 810 or by providing this information directly to the deployment component 814. The instance manager can be considered part of the deployment component.

Customer account information 815 can include any desired information associated with a customer of the multitenant environment. For example, the customer account information can include a unique identifier for a customer, a customer address, billing information, licensing information, customization parameters for launching instances, scheduling information, auto-scaling parameters, previous IP addresses used to access the account, etc.

A network 830 can be utilized to interconnect the server computers 802A-802D and the server computer 804. The network 830 can be a local area network (LAN) and can be connected to a Wide Area Network (WAN) 840 so that end customers can access the compute service provider 800. It should be appreciated that the network topology illustrated in FIG. 8 has been simplified and that many more networks and networking devices can be utilized to interconnect the various computing systems disclosed herein.

Figure 9:
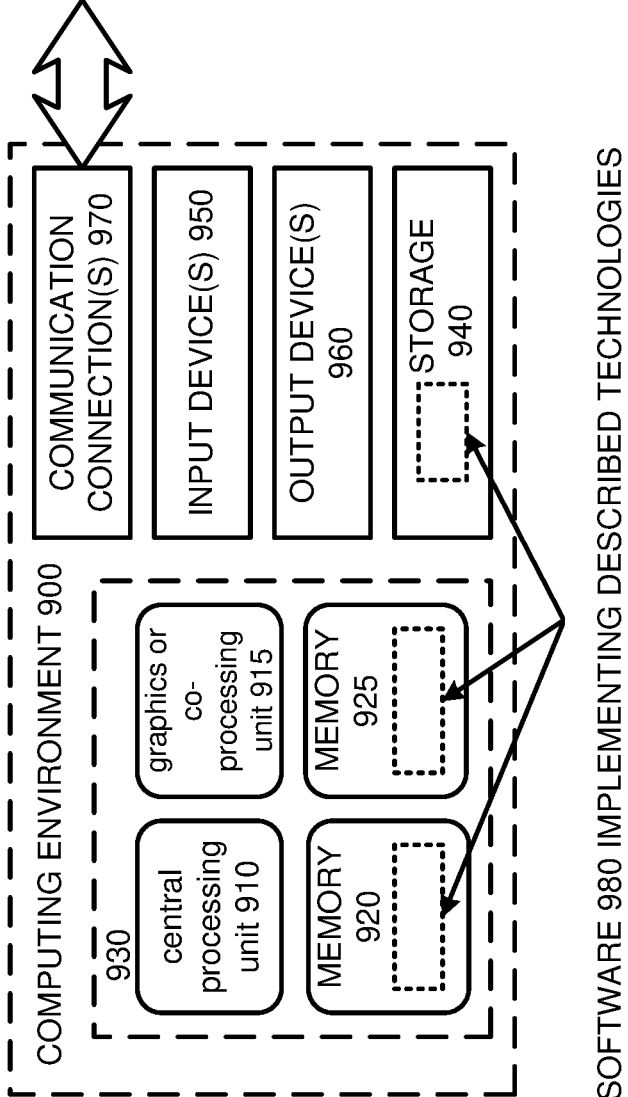
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.). In some examples, one or more components of the computing environment may be included in the host devices 108/204/304*a/b* of FIGS. 1, 2, and 3, the edge devices 110*a/b*/206/306 of FIGS. 1, 2, and 3, the endpoints 106/208/308 of FIGS. 1, 2, and 3, the user devices 104/202/302 of FIGS. 1, 2, and 3, and/or any other devices described herein. In additional or alternative examples, one or more components of FIGS. 1, 2, and 3 may be examples of components of the computing environment 900, as described below.

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). For example, one or more of the memory 920, 925 may include the unique ID mapping of FIG. 1 (or related unique ID mapping data structures described with respect to FIGS. 1-4B above). In additional or alternative examples, one or more of the memory 920, 925 stores software 980 implementing one or more innovations described herein, in the form of computer-executable instructions suitable for execution by the processing unit(s). For example, one or more of the memory 920, 925 may store instructions for performing routing control, encapsulating/decapsulating packets, mapping unique IDs to IP addresses (or vice versa), etc.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. In some examples, the storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware.

Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computing system comprising:
    a central control layer system storing and managing a data structure mapping unique IDs to Internet Protocol (IP) addresses in a network;
    an endpoint device in the network;
    an edge device in the network, the edge device comprising a packet decapsulation component and configured to route data toward the endpoint device; and
    a host device, the host device comprising:
        a processor,
        a storage device storing a copy of the data structure mapping unique IDs to the IP addresses in the network, and
        a packet encapsulation component configured to, responsive to receiving a packet specifying a destination IP address from a user device:
            map the destination IP address to an associated unique ID;
            encapsulate the packet to form an encapsulated packet including an outer packet and an inner packet;
            insert the unique ID in a Media Access Control (MAC) address header field of the inner packet;
            modify a destination address field of the inner packet to specify an internal IP address for the endpoint device used by the network; and
            transmit the encapsulated packet to the edge device for routing to the endpoint device.

2. The computing system of claim 1, wherein the outer packet specifies a host address of the host device in a source header field and an edge address of the edge device in a destination header field.

3. The computing system of claim 1, wherein the encapsulated packet further comprises a middle packet specifying an edge address of the edge device in a source header field and the internal IP address for the endpoint device in a destination header field.

4. The computing system of claim 1, wherein the MAC address header field is one of a source MAC address field or a destination MAC address field, and wherein the packet encapsulation component is further configured to insert a port of the endpoint device in the other of the source MAC address field or the destination MAC address field.

5. The computing system of claim 1, wherein the unique ID is a first unique ID and the destination IP address is a first destination IP address, and wherein the packet encapsulation component is further configured to, responsive to receiving a return packet including a second unique ID in a return MAC address header field of the return packet:
    map the second unique ID to an associated second destination IP address;
    generate a modified return packet by updating a source address header field of the return packet to specify the second destination IP address; and
    transmit the modified return packet to the user device, wherein the user device is specified in a destination header field of the return packet.

6. The computing system of claim 1, wherein the IP address for the endpoint device in the network comprises an IPv6 address.

7. A method comprising:
    receiving a packet indicating a destination address, the destination address being a network address of a network device of a network;
    determining a unique identifier (ID) corresponding to the destination address, the unique ID being shorter than the destination address, and the unique ID being uniquely mapped to the network address of the network device;
    updating and routing the packet through the network to an endpoint, wherein the unique ID is included in a header field of the packet;
    receiving an encapsulated return packet including the unique ID in a header field of an innermost packet of the encapsulated return packet;
    mapping the unique ID to the destination address using a mapping structure;
    replacing a source address of the innermost packet of the encapsulated return packet with the destination address mapped to the unique ID to form a modified return packet; and
    transmitting the modified return packet to a user device specified in a destination address field of the innermost packet of the encapsulated return packet.

8. The method of claim 7, wherein the unique ID is included in a Media Access Control (MAC) address header field of the packet.

9. The method of claim 8, further comprising encapsulating the packet to generate an encapsulated packet, and wherein the MAC address header field is in an innermost packet of the encapsulated packet.

10. The method of claim 9, wherein the destination address is a first IP address corresponding to the network device, and wherein the encapsulated packet specifies a second IP address for the endpoint in an IP address field of the innermost packet.

11. The method of claim 9, wherein the unique ID is included in a first one of a destination MAC address header field or a source MAC address header field, and wherein a port specified in the destination address for the network device is included in a second, different one of the destination MAC address header field or the source MAC address header field.

12. The method of claim 7, wherein determining the unique ID includes using the mapping data structure configured to provide a one-to-one unique mapping of unique IDs to IP addresses for network devices in the network, and wherein the mapping data structure is received from a central control plane of the network.

13. The method of claim 12, wherein
the unique ID is included in a Media Access Control (MAC) address header field of the innermost packet of the encapsulated return packet.

14. The method of claim 12, wherein the mapping data structure comprises a lookup table or a distributed hash table.

15. The method of claim 7, wherein the header field is a variable length options field of a Geneve header.

16. A system comprising:
a host device of a network, the host device comprising a packet encapsulation service configured to execute instructions stored on the host device to:
   receive, from an edge device of the network, a return packet specifying an address of a user device in an IP destination address field, a private address of an endpoint in the network in an IP source destination address field, and a unique identifier (ID) in a Media Access Control (MAC) address field;
map, using a mapping data structure stored in the host device, the unique ID to a public address;
modify the IP source address field to replace the private address with the public address; and
transmit the return packet with the modified IP source address to the user device.

17. The system of claim 16, wherein the unique ID comprises a 6 byte value uniquely mapped to the public address, and wherein the public address is larger than 6 bytes.

18. The system of claim 17, wherein the public address is an IPv6 address.

19. The system of claim 16, wherein the return packet is an encapsulated packet, and wherein the packet encapsulation service is further configured to execute instructions stored on the host device to strip an outermost packet of the return packet prior to transmitting the return packet with the modified IP source address to the user device.

20. The system of claim 16, wherein the mapping data structure is received from a central control plane of the network, and wherein the host device is configured to receive updates to the mapping data structure as network devices or public destination addresses are added to or removed from the network.

\* \* \* \* \*